US012586481B1

(12) United States Patent
Mooney

(10) Patent No.: US 12,586,481 B1
(45) Date of Patent: Mar. 24, 2026

(54) METHOD OF GENERATING QUESTIONS WITH BLANKS

(71) Applicant: Quizlet, Inc., San Francisco, CA (US)

(72) Inventor: Shane Curtis Mooney, San Mateo, CA (US)

(73) Assignee: Quizlet, Inc., San Francisco, CA (US)

( * ) Notice: Subject to any disclaimer, the term of this patent is extended or adjusted under 35 U.S.C. 154(b) by 511 days.

(21) Appl. No.: 18/297,494

(22) Filed: Apr. 7, 2023

(51) Int. Cl.
$G09B$ 7/02         (2006.01)
$G09B$ 7/077       (2006.01)

(52) U.S. Cl.
CPC .............. $G09B$ 7/02 (2013.01); $G09B$ 7/077 (2013.01)

(58) Field of Classification Search
CPC .................................. G09B 7/00; G09B 7/02
See application file for complete search history.

(56) References Cited

U.S. PATENT DOCUMENTS

2019/0156220 A1* 5/2019 Zhu ........................ G06N 5/041
2021/0191926 A1  6/2021 Izenson et al.

FOREIGN PATENT DOCUMENTS

JP        2012234106 A    11/2012
KR        102460689 B1    10/2022
WO        2015020299 A1    2/2015

OTHER PUBLICATIONS

Kr102460689, publication date Oct. 28, 2022, original and translated copies submitted in the Jun. 9, 2023 IDS (Year: 2022).*
F. Dernoncourt et al., "NeuroNER: an easy-to-use program for named-entity recognition based on neural networks," arXiv:1705.05487 [cs.CL], pub. May 16, 2017, 6 pages.

* cited by examiner

*Primary Examiner* — Thomas J Hong
(74) *Attorney, Agent, or Firm* — Baker Botts L.L.P.

(57)                ABSTRACT

In one embodiment, a computer-implemented method executed using an application server computer that is communicatively coupled to a database via a telecommunication network, the database comprising a digitally stored relational table schema storing a plurality of term sets, each of the term sets comprising a plurality of terms, the application server computer hosting an application program programmed with a fill-in-the-blank (FITB) question generator service, the method comprising: using the application server computer, receiving input specifying a particular term that does not include an FITB portion, and in response thereto, using the application server computer, executing an inference stage of a trained machine learning model over the particular term as input to generate output predictions comprising a token position and number of tokens of a target span of an FITB portion; using the application server computer, post-processing the output predictions by computing a penalty score, selecting a final position, and determining a final span to blank; using the application server computer, digitally storing a modified term comprising the FITB portion at the final position.

12 Claims, 6 Drawing Sheets

Fig. 1A

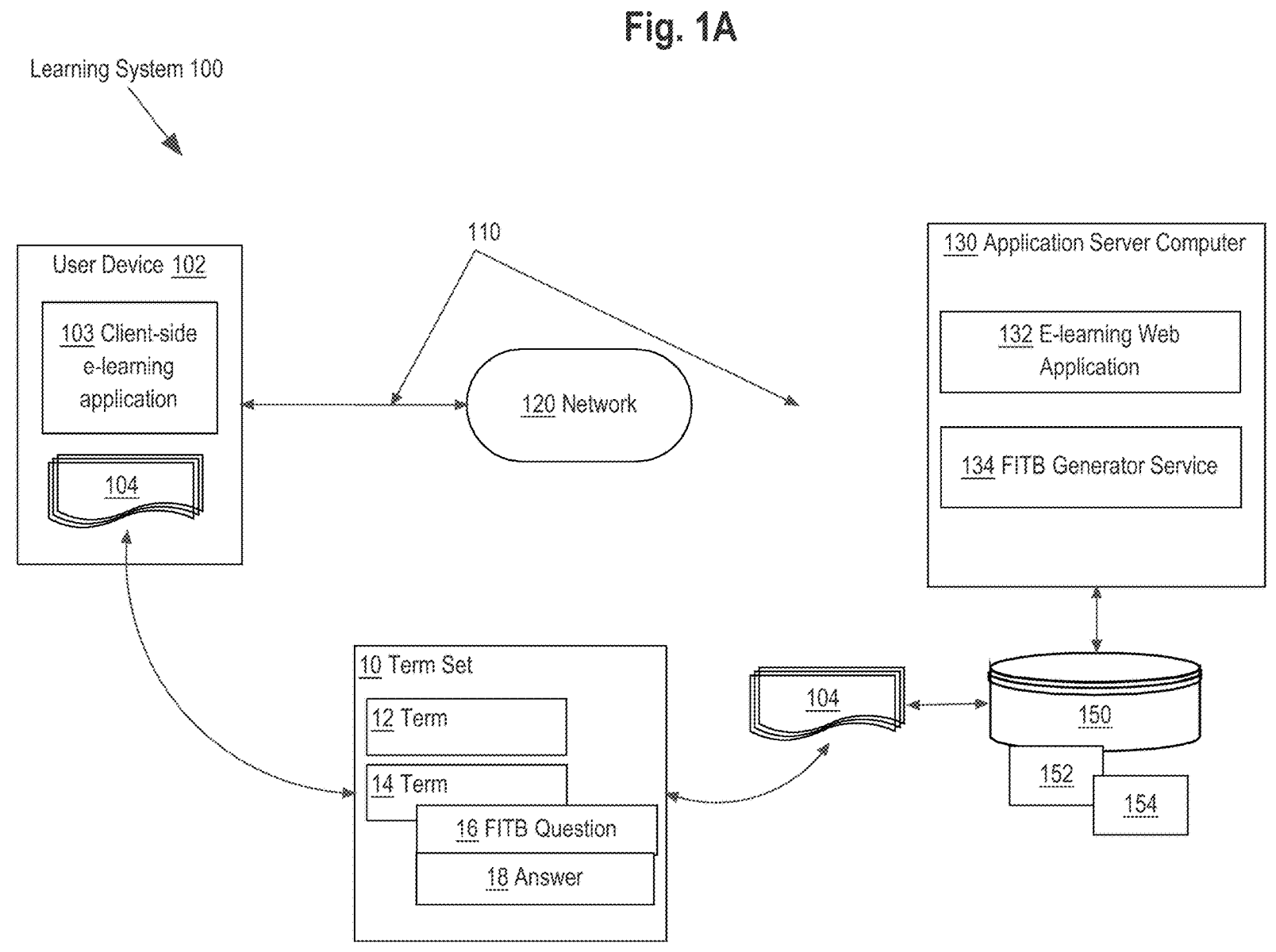

Learning System 100

110

120 Network

130 Application Server Computer

132 E-learning Web Application

134 FITB Generator Service

150

152

154

104

User Device 102

103 Client-side e-learning application

104

10 Term Set

12 Term

14 Term

16 FITB Question

18 Answer

Fig. 1B

SERVER AND/OR CLOUD SERVICES

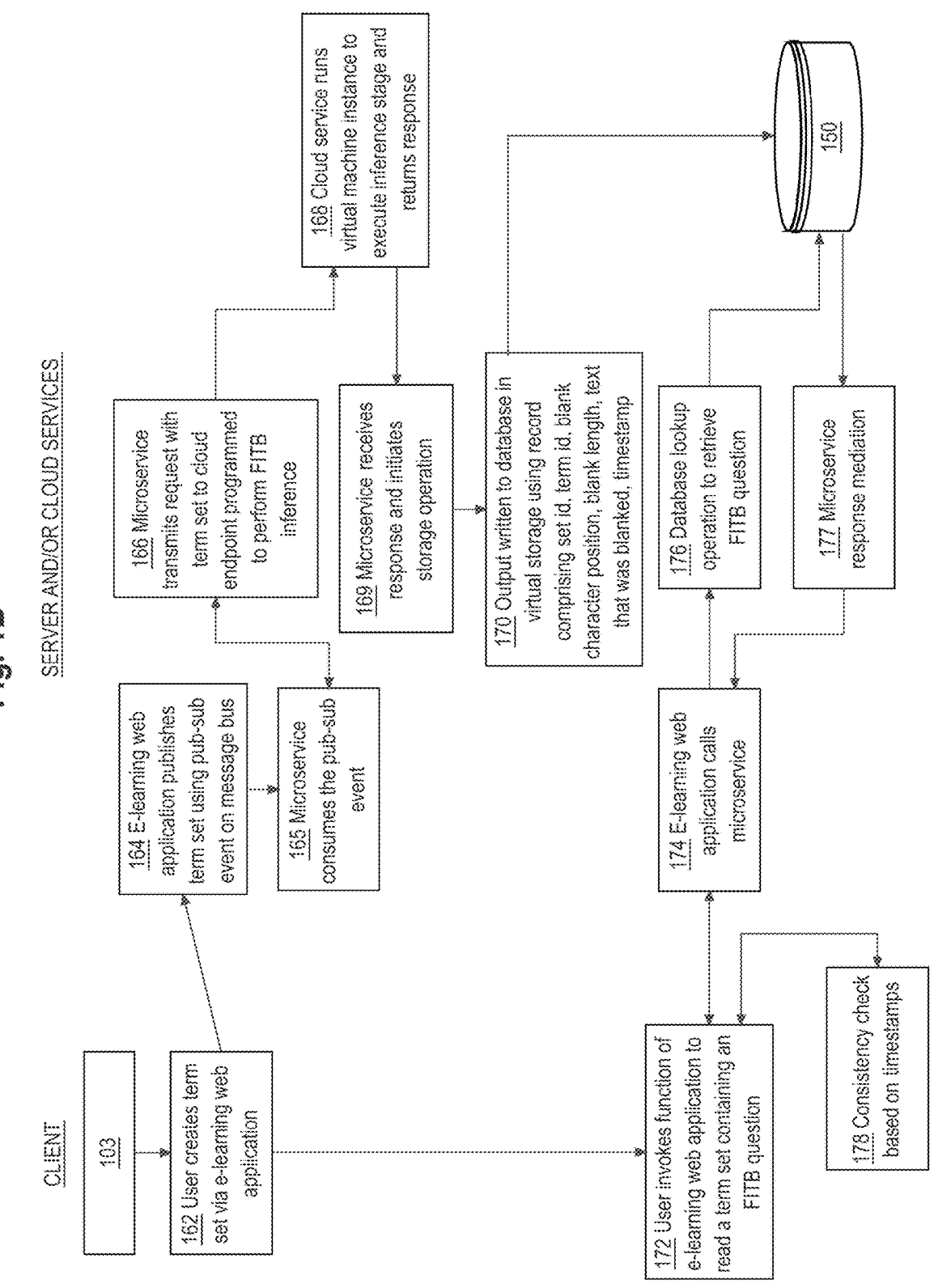

CLIENT

103

162 User creates term set via e-learning web application

164 E-learning web application publishes term set using pub-sub event on message bus 165 Microservice consumes the pub-sub event 166 Microservice transmits request with term set to cloud endpoint programmed to perform FITB inference 168 Cloud service runs virtual machine instance to execute inference stage and returns response 169 Microservice receives response and initiates storage operation 170 Output written to database in virtual storage using record comprising set id, term id, blank character position, blank length, text that was blanked, timestamp

150

172 User invokes function of e-learning web application to read a term set containing an FITB question 174 E-learning web application calls microservice 176 Database lookup operation to retrieve FITB question 177 Microservice response mediation 178 Consistency check based on timestamps

Fig. 2A

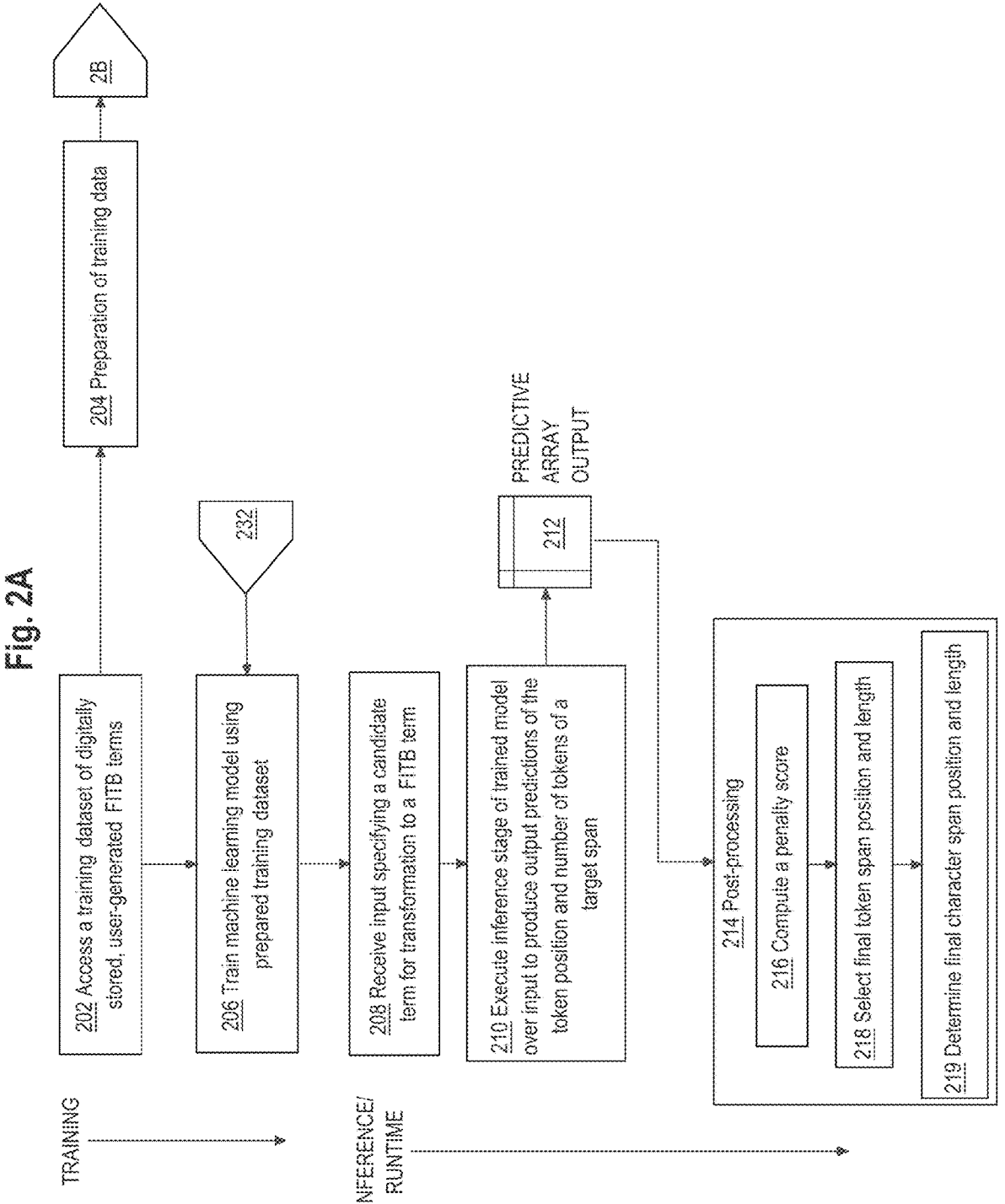

TRAINING

202 Access a training dataset of digitally stored, user-generated FITB terms

204 Preparation of training data

2B

206 Train machine learning model using prepared training dataset

232

INFERENCE/RUNTIME

208 Receive input specifying a candidate term for transformation to a FITB term

210 Execute inference stage of trained model over input to produce output predictions of the token position and number of tokens of a target span

PREDICTIVE ARRAY OUTPUT

212

214 Post-processing

216 Compute a penalty score

218 Select final token span position and length

219 Determine final character span position and length

Fig. 2B

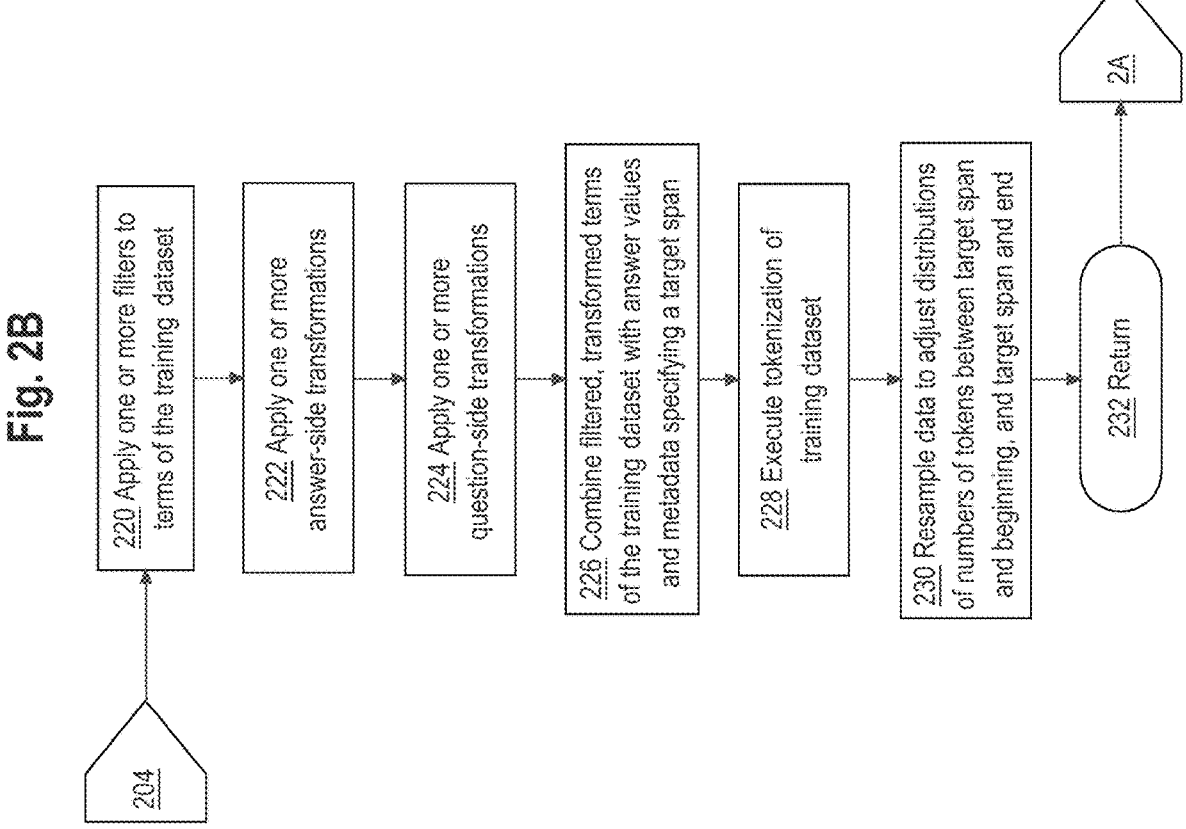

204

220 Apply one or more filters to terms of the training dataset

222 Apply one or more answer-side transformations

224 Apply one or more question-side transformations

226 Combine filtered, transformed terms of the training dataset with answer values and metadata specifying a target span 228 Execute tokenization of training dataset 230 Resample data to adjust distributions of numbers of tokens between target span and beginning, and target span and end 232 Return

2A

METHOD OF GENERATING QUESTIONS WITH BLANKS

COPYRIGHT NOTICE

TECHNICAL FIELD

One technical field of the present disclosure is computer-implemented artificial intelligence applied to online education systems, using trained machine learning models to generate questions with blanks that can be presented to learners for educational purposes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditional online learning systems have made targeted instructions for students, in a wide variety of subjects and learning modes, more accessible than ever before. Outside of traditional educational institutions, diverse groups of users spread across the globe can learn almost anything without ever setting foot in a classroom. The learning modes can be a flashcard mode, a learn and write mode, a test mode, and other modes. For example, users can apply a learn-and-write mode which includes a personalized study plan to study fill-in-the-blank (FITB) and/or multiple choice questions (MCQs) based on their familiarity with a set's content and advance the education from easy to complex questions. As another example, users can apply a flashcard or test mode to test knowledge with flashcards and review terms and definitions of a text word in a flashcard. Various learning modes collectively provide expert solutions to help users through questions of different formats. Users can quickly understand the reasons behind the right answer during the learning process and apply the knowledge in their future study.

Automatically generating FITB questions poses special problems in this context. Effective questions include a single blank, representing one or more target words or answer words to be filled in, with no instances of multiple non-contiguous blanks. While a training dataset of user-generated FITB may be available, finding effective machine-learning model architectures has created challenges. One approach is to use a static, index-based model of the rate at which an n-gram appears exactly as the target word in previously created and stored terms, by subject. Another approach is to use a fine-tuned text-to-text transfer transformer (T5) model.

Based on the foregoing, the relevant technical field has developed a need for improved, practical approaches for automatically generating useful fill-in-the-blank questions for use in digital flashcards or other aspects of online educational computing systems using machine-implemented methods.

SUMMARY

The appended claims may serve as a summary of the invention.

BRIEF DESCRIPTION OF THE DRAWINGS

In the drawings:

FIG. 1A illustrates a distributed computer system with which one or more embodiments can be implemented;

FIG. 1B illustrates a data flow in one method of operating the system of FIG. 1A;

FIG. 2A, FIG. 2B illustrates an example computer-implemented process that can be programmed to implement an embodiment of training and executing the FITB generator service of FIG. 1A;

DETAILED DESCRIPTION

Figure 3:
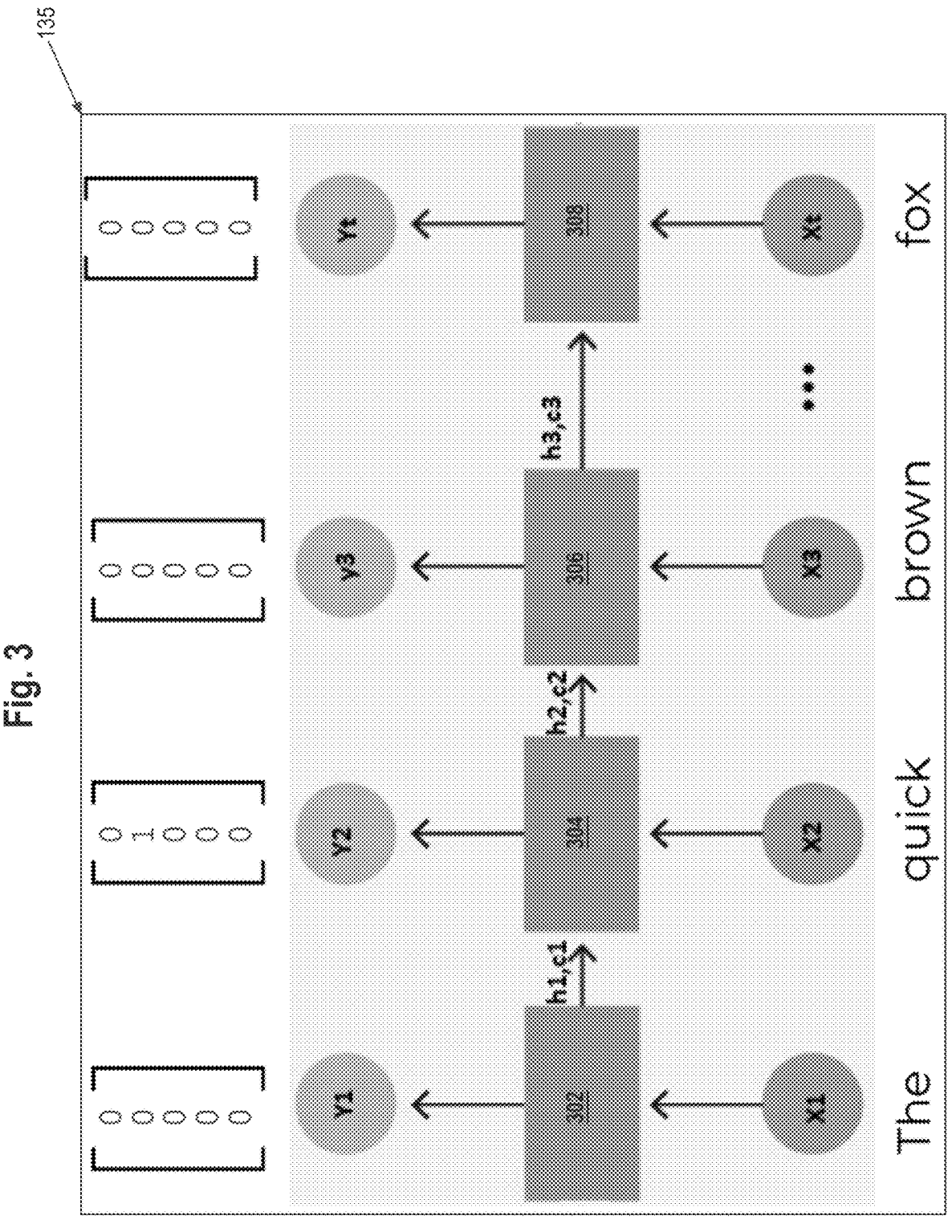
FIG. 3 illustrates an example of a long short term memory (LSTM) neural network architecture that can be used in an embodiment.
Figure 4:
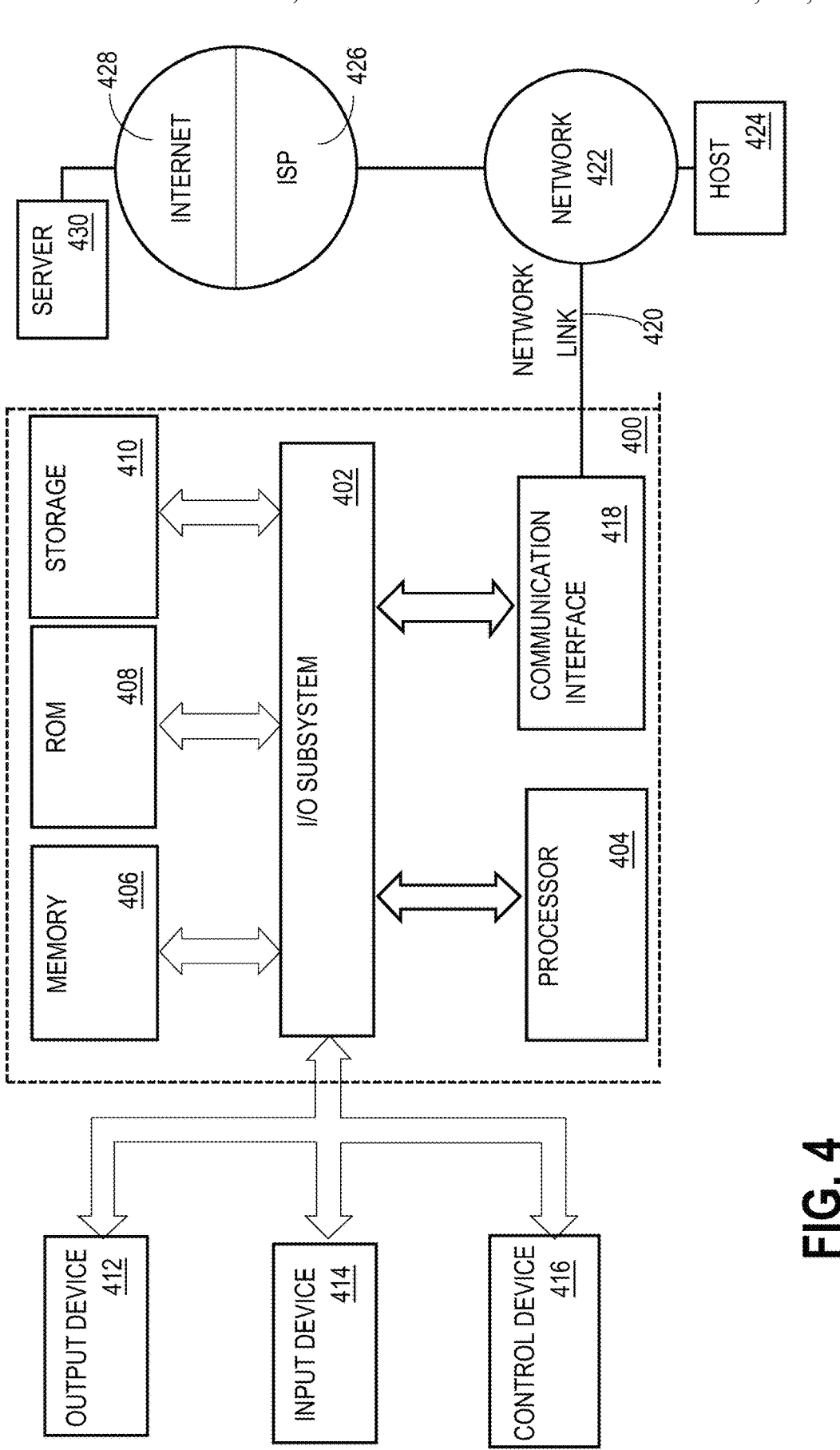
FIG. 4 illustrates a computer system with which the user device and/or application server computer could be implemented, in various embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis for interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

A machine learning model such as a long short term memory (LSTM) model configured based on specified parameters, coupled to a training dataset of user-created fill-in-the-blank (FITB) questions for use in an e-learning platform, integrated into a training method that prepares the training dataset in specified ways and trains the model based on the prepared training data, can be programmed to automatically generate FITB questions for newly created term sets of terms that do not include FITB questions. Embodiments can substantially increase the efficiency and utility of an e-learning platform by increasing the number of available FITB questions automatically, and accurately, when learners, administrators, or other users have not natively created the questions.

Various embodiments encompass the subject matter of the following numbered clauses:

1. A computer-implemented method executed using an application server computer that is communicatively coupled to a database via a telecommunication network, the database comprising a digitally stored relational table schema storing a plurality of term sets, each of the term sets comprising a plurality of terms, the application server computer hosting an application program programmed with a fill-in-the-blank (FITB) question generator service, the method comprising: using the application server computer, receiving input specifying a particular term that does not include an FITB portion, and in response thereto, using the application server computer, executing an inference stage of a trained machine learning model over the particular term as input to generate output predictions comprising a token position and number of tokens of a target span of an FITB portion; using the application server computer, post-processing the output predictions by computing a penalty score, selecting a final position, and determining a final span to blank; using the application server computer, digitally storing a modified term comprising the FITB portion at the final position.

2. The computer-implemented method of clause 1, further comprising, before receiving the input: programmatically creating an untrained machine learning model; accessing a training dataset of digitally stored, user-generated FITB terms; executing one or more operations of preparation of the training dataset; training the untrained machine learning model to result in creating and storing the trained machine learning model.

3. The computer-implemented method of clause 1, wherein the executing one or more operations of preparation of the training dataset comprises: applying one or more filters to terms of the training dataset; applying one or more answer-side transformations to terms of the training dataset; applying one or more question-side transformations to terms of the training dataset; combining the filtered, transformed terms of the training dataset with answer values and metadata specifying target spans; executing tokenization of the training dataset; resampling the training dataset adjust distributions of numbers of tokens between the target spans and beginnings, and target spans and ends.

4. The computer-implemented method of clause 1, wherein the trained machine learning model comprises a bidirectional long short-term memory model.

5. The computer-implemented method of clause 1, wherein the trained machine learning model comprises a bidirectional long short-term memory model having 300 memory units, an embedding dimension of 100, an input length of 50, and a dense units parameter of 10.

6. The computer-implemented method of clause 1, further comprising, using the application server computer, formatting and transmitting, to a client computer, presentation instructions which when rendered using the client computer cause presenting a user interface comprising the modified term comprising the FITB portion at the final position in response to a request from the client computer to view the particular term.

7. The computer-implemented method of clause 1, each of the term sets corresponding to an educational subject in an e-learning system, each of the terms in the plurality of terms comprising a digitally stored question associated with the educational subject.

8. The computer-implemented method of clause 1, the output predictions being generated in a two-dimensional array of values comprising a probability of a pair of a start token and a number of tokens corresponding to a position and length of a potential span to blank; the method further comprising: for a finite number of iterations: finding a maximum position in the array, the maximum position specifying a candidate token; calculating a penalty score using a per-token score of: "1" when a candidate token exactly matches any context token among one or more context tokens, the context tokens comprising tokens outside the blank or on the other side of the term; "0.5" when the candidate token is a substring of any of the context tokens; "0.25" when any of the context tokens is a substring of the candidate token; and "0" otherwise; and calculating the penalty score as an average of all the per-token scores; when the penalty score is greater than "0", multiplying the maximum position in the array and continuing a then-current iteration; when the penalty score is "0", using the maximum position as a token span to blank and ending the iterations.

9. One or more non-transitory computer-readable storage media storing one or more sequences of instructions which, when executed using one or more processors, cause the one or more processors to execute: using an application server computer that is communicatively coupled to a database via a telecommunication network, the database comprising a digitally stored relational table schema storing a plurality of term sets, each of the term sets comprising a plurality of terms, the application server computer hosting an application program programmed with a fill-in-the-blank (FITB) question generator service, receiving input specifying a particular term that does not include an FITB portion, and in response thereto, using the application server computer, executing an inference stage of a trained machine learning model over the particular term as input to generate output predictions comprising a token position and number of tokens of a target span of an FITB portion; using the application server computer, post-processing the output predictions by computing a penalty score, selecting a final position, and determining a final span to blank; using the application server computer, digitally storing a modified term comprising the FITB portion at the final position.

10. The one or more non-transitory computer-readable storage media of clause 9, further comprising one or more sequences of instructions which, when executed using one or more processors, cause the one or more processors to execute, before receiving the input: programmatically creating an untrained machine learning model; accessing a training dataset of digitally stored, user-generated FITB terms; executing one or more operations of preparation of the training dataset; training the untrained machine learning model to result in creating and storing the trained machine learning model.

11. The one or more non-transitory computer-readable storage media of clause 9, wherein the executing one or more operations of preparation of the training dataset comprises one or more sequences of instructions which, when executed using one or more processors, cause the one or more processors to execute: applying one or more filters to terms of the training dataset; applying one or more answer-side transformations to terms of the training dataset; applying one or more question-side transformations to terms of the training dataset; combining the filtered, transformed terms of the training dataset with answer values and metadata specifying target spans; executing tokenization of the training dataset; resampling the training dataset adjust distributions of numbers of tokens between the target spans and beginnings, and target spans and ends.

12. The one or more non-transitory computer-readable storage media of clause 9, wherein the trained machine learning model comprises a bidirectional long short-term memory model.

13. The one or more non-transitory computer-readable storage media of clause 9, wherein the trained machine learning model comprises a bidirectional long short-term memory model having 300 memory units, an embedding dimension of 100, an input length of 50, and a dense units parameter of 10.

14. The one or more non-transitory computer-readable storage media of clause 9, further comprising one or more sequences of instructions which, when executed using one or more processors, cause the one or more processors to execute, using the application server computer, formatting and transmitting, to a client computer, presentation instructions which when rendered using the client computer cause presenting a user interface comprising the modified term comprising the FITB portion at the final position in response to a request from the client computer to view the particular term.

15. The one or more non-transitory computer-readable storage media of clause 9, each of the term sets corresponding to an educational subject in an e-learning system, each of the terms in the plurality of terms comprising a digitally stored question associated with the educational subject.

16. The one or more non-transitory computer-readable storage media of clause 9, the output predictions being generated in a two-dimensional array of values comprising a probability of a pair of a start token and a number of tokens corresponding to a position and length of a potential span to blank; the method further comprising one or more sequences of instructions which, when executed using one or more processors, cause the one or more processors to execute: for a finite number of iterations: finding a maximum position in the array, the maximum position specifying a candidate token; calculating a penalty score using a per-token score of: "1" when a candidate token exactly matches any context token among one or more context tokens, the context tokens comprising tokens outside the blank or on the other side of the term; "0.5" when the candidate token is a substring of any of the context tokens; "0.25" when any of the context tokens is a substring of the candidate token; and "0" otherwise; and calculating the penalty score as an average of all the per-token scores; when the penalty score is greater than "0", multiplying the maximum position in the array and continuing a then-current iteration; when the penalty score is "0", using the maximum position as a token span to blank and ending the iterations.

2. Structural & Functional Overview

2.1 Distributed Computer System Example

FIG. 1A illustrates a distributed computer system with which one or more embodiments can be implemented; FIG. 1B illustrates a data flow in one method of operating the system of FIG. 1A. For purposes of illustrating a clear example, the drawing figures show specific configurations of components, but other configurations may be used in other embodiments. For example, components of the drawing figures could be combined to create a single component, or the functions of a single component could be implemented using two or more components.

Referring first to FIG. 1A, in an embodiment, a distributed computer system organized as a learning system 100 is configured for automatically generating a plurality of candidate distractors for digitally stored terms that are associated with a term set. FIG. 1, the other drawing figures, and all the descriptions and claims in this disclosure are intended to present, disclose, and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of identifying one or more images which are semantically like the text information of an input question. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

Certain embodiments are described in the context of online, real-time response, automated e-learning systems. However, other embodiments can be used in domains other than education to generate candidate responses to prompts, questions, or statements of a variety of types, and the scope of the disclosure is not limited to e-learning or education.

In one embodiment, the learning system 100 comprises a user device 102 that can be associated with a user of interest, such as a student, and is communicatively coupled using one or more telecommunication connections 110 and a network 120 to an application server computer 130. In an embodiment, the application server computer 130 is communicatively coupled to network 120 and to database 150, which can be programmed using a relational table schema to store a plurality of relational tables 152, 154. The user device 102 and application server computer 130 can interoperate to create, transmit, present, and receive response signals relating to digitally stored flashcards 104. Each of the flashcards 104 can be associated, in database table 152 of database 150, with digital data specifying a term 12, 14 that is associated with a term set 10, where each term 12, 14 is associated with a plurality of distractors 16, 18, 20.

In one embodiment, each flashcard 104 can comprise two sides of digitally stored text data, such as a word side text Qword, a definition side text Qdef, or both as a Qterm. Qterm can be a concatenation of a QWord and QDef to combine the word side text and the definition side text of the flashcard 104. For example, in an embodiment, under the control of a client-side e-learning application 103, the user device 102 can signal a choice of a flashcard 104 which includes a question that can be characterized by a Qword, such as "What is a Nucleoid?" or "A nucleoid is a _____", a Qdef, such as "in prokaryotes, it is where the cell's DNA is stored but it is not an enclosed organelle", or a Qterm, such as "What is a Nucleoid? in prokaryotes it is where the cell's DNA is stored but it is not an enclosed organelle." Other embodiments can use a browser program at the user device 102 to programmatically interoperate with an e-learning web application 132 hosted at the application server computer 130. While the foregoing presents an example of an online, real-time interaction between the user device 102 and the application server computer 130, certain embodiments also use offline, back-end, or batch processing under the control of the application server computer to transform records of the database 150 without interaction with user device 102, as further described in other sections herein.

For purposes of illustrating a clear example, FIG. 1A shows a user device 102 and a flashcard 104 via a single logical connection 110, but other embodiments can use any number of user devices to create, read, and signal responses to flashcards and the present disclosure specifically contemplate executing with thousands to millions of flashcards 104, term sets 10, terms 12, 14, and distractors 16, 18, 20.

At application server computer 130, the e-learning web application 132 can comprise one or more sequences of stored program instructions that implement an HTTP server and business logic to execute e-learning functions such as creating student accounts, receiving data to specify schools and courses, determining one or more term sets 10 that are relevant to courses in which student accounts are enrolled, presenting terms 12, 14 and distractors 16, 18, 20, evaluating response signals, transmitting answers, and otherwise managing an e-learning process.

The application server computer 130 further comprises, in one embodiment, a FITB generator service 134, which can be implemented as sequences of stored instructions that are programmed to generate a FITB question 16 for association with an answer 18 for a particular term 12, 14, using a plurality of programmed algorithms and machine learning models. In some embodiments, the FITB generator service 134 comprises a microservice that the e-learning web application 132 or other services or applications can call programmatically. Further, in an embodiment, the FITB generator service 134 can be programmed to execute as an offline, back-end, or batch job to access or read many term sets 10 and terms 12, 14 successively, to execute the plurality of algorithms and evaluate the machine learning models in inference stages to generate FITB questions 16 with corresponding answers 18 and digitally store the FITB questions, answers, and metadata in one or more of the tables 152, 154, as further described.

In one embodiment, user device 102 may be a computer that includes hardware capable of communicatively coupling the device to the application server computer 130, over one or more service providers. For example, user device 102 may include a network card that communicates with application server computer 130, through a home or office wireless router (not illustrated in FIG. 1A) that is communicatively coupled to an internet service provider. The user device 102 may be a smartphone, personal computer, tablet computing device, PDA, laptop computer, or any other computing device capable of transmitting and receiving information and performing the functions described herein.

In one embodiment, the user device 102 may comprise device memory, an operating system, one or more application programs such as client-side e-learning application 103 and/or a browser, and/or one or more application extensions. In one embodiment, user device 102 hosts and executes the client-side e-learning application 103, which the user device 102 may download and install from application server computer 130, an application store, or another repository. The client-side e-learning application 103 is compatible with e-learning web application 132 and may communicate using an app-specific protocol, parameterized HTTP POST and GET requests, and/or other programmatic calls. In some embodiments, client-side e-learning application 103 comprises a conventional internet browser application that can communicate over network 120 to other functional elements via HTTP and is capable of rendering dynamic or static HTML, XML, or other markup languages, including displaying text, images, accessing video windows and players, and so forth. In embodiments, application server computer 130 may provide an application extension for client-side e-learning application 103 through which the communication and other functionality may be implemented. In embodiments, a device display, such as a screen, may be coupled to the user device 102 to render a graphical user interface based on presentation instructions transmitted from the application server computer 130.

For example, the client-side e-learning application 103 may be programmed to provide a text input in a query as a question in a flashcard for a user of interest in a learning mode. As another example, the client-side e-learning application 103 may be programmed to receive a text input in a query by a user from the device display running on the user device 102. The text input can include a word side of the question, such as a Qword, or a definition side of the question, such as a Qdef, or both. The client-side e-learning application 103 may be programmed to send the received text input from the user device 102 in a query via network 120 to the application server computer 130 as text data. For example, the text input may be any text string made up of one or more unigrams. As used herein, unigrams may be determined from words or groups of words, any part of speech, punctuation marks (e.g., "%"), colloquialisms (e.g., "move forward"), acronyms (e.g., "MCQ"), abbreviations (e.g., "ct."), exclamations ("ugh"), alphanumeric characters, symbols, written characters, accent marks, or any combination thereof. As another example, the text input may be an input Qword of "What is a Nucleoid?" which includes multiple unigrams, such as "What", "is", "a", "Nucleoid", and "?".

The application server computer 130 may be implemented using a server-class computer or other computer having one or more processor cores, co-processors, or other computers. The application server computer 130 may be a physical server computer and/or one or more virtual machine instances and/or virtual storage instances hosted or executed using in a private or public data center, such as through a cloud computing service or facility. In one embodiment, an application server computer may be implemented using two or more processor cores, clusters, or instances of physical machines or virtual machines, configured in a discrete location or co-located with other elements in a data center, shared computing facility, or cloud computing facility.

Each of the functional components of the learning system 100 can be implemented as one or more sequences of stored program instructions stored in non-transitory computer-readable storage media, other software components, general or specific-purpose hardware components, firmware components, or any combination thereof. A storage component, such as database 150, can be implemented using any of relational databases, object databases, flat file systems, or JSON stores. A storage component like database 150 can be connected to the functional components locally or through the networks using programmatic calls, remote procedure call (RPC) facilities, or a messaging bus. A component may or may not be self-contained. Depending upon implementation-specific or other considerations, the components may be centralized or distributed functionally or physically.

As further described in detail in other sections, FITB generator service 134 is programmed or configured to automatically generate FITB terms based on receiving candidate terms as input. To do so, FITB generator service 134 executes the inference stage of a trained machine learning model 135 over the input. In an embodiment, machine learning model 135 is a long short-term memory (LSTM) artificial neural network model and can be implemented, for example, using the TensorFlow version 2.3.4 library, Keras 2.4.0, and Spacy 4.3.0, as further described.

The structure of FIG. 1A can be placed in the context of a complete, end-to-end operation of creating an FITB question and displaying it with a term set with reference to FIG. 1B. In an embodiment, in one possible method of operation, at block 162, a user of a mobile device 102 and application 103 creates a term set by interoperating with the e-learning web application of the application server computer 130. Block 162 can be implemented using a web application interface that uses dynamic HTML forms with GUI widgets that are programmed to accept selections, data values, or text to create a term set, name the term set, create a term within a term set, name the term, specify at least one question, specify an answer, and command the system to save the term and/or term set.

In response, at block 164, the e-learning web application publishes the term set using a pub-sub event on a message bus that the application internally manages to facilitate inter-process communication between functional elements of the application. Any commercially available or open-source enterprise service bus product or software can operate or execute in conjunction with the application server computer 103 to provide a message bus service for this purpose.

At block 165, a listener process, which can be implemented as a Kubernetes-based microservice, consumes the pub-sub event of block 164. In one embodiment, block 165 and other blocks of FIG. 1B, as further described, are implemented as part of a support service having a plurality of different callable functions, including triggering and caching inferences of multiple kinds, such as FITB questions, multiple-choice questions, and question type recommendations. Some embodiments can term the microservice "Hex," but other embodiments can use other labels or names for functionally equivalent programming. At block 166, the microservice transmits a request, with the contents of the term set, to a cloud endpoint that is programmed to perform FITB inference processing. In some embodiments, block 166 comprises calling a cloud service endpoint to initiate running a virtual machine instance to execute the inference stage of the FITB generator service 134. For example, the FITB generator service 134 runs as an instance of Google Vertex endpoints, which is designed to run ML models. Block 168 represents a cloud service provider such as a Vertex endpoint executing or running a virtual machine instance to execute the inference stage of the FITB generator service 134 and to return a response. At block 169, the microservice receives the response and initiates a storage operation.

In an embodiment, block 166 can include executing a set of rules to determine whether a particular term is eligible for processing to generate a FITB question or element of the term. Example requirements for determining term eligibility, at or just before executing the inference stage, are further described in section 2.2.4 below.

At block 170, the output of the FITB generator service 134 is written to a database in virtual storage and/or using the database 150. For example, the FITB generator service 134 can write results to a Google Spanner database. In one embodiment, results are written as database records each comprising a set identifier and a term identifier as key values, and comprising attribute values for the character position of the start of a blank, length of a span, a string value for the text that was blanked in that position, and a timestamp.

The operations of block 164, block 165, block 166, block 168, block 169, block 170 can be implemented using real-time, on-demand processes or threads that execute immediately in response to the user creating a term or term set as shown in block 162. Alternatively, the steps of block 164, block 165, block 166, block 168, block 169, and block 170 can execute using a batch process at a specified time, such as using a nightly or daily scheduled job or cron job, to process all terms and term sets that all users of the application server computer 130 created and stored in a specified period. Thus, the method herein can include using the application server computer to repeat the steps of block 164, block 166, block 168, block 170 for a plurality of terms of each of the term sets as part of an offline process.

At some point thereafter, at block 172, the same user or another user invokes a function of the e-learning web application to read a term set containing a FITB question. At block 174, the e-learning web application calls a function of the microservice, providing a request to retrieve a FITB question for the term set that the user wants to read at block 172. At block 176, the microservice triggers a database lookup operation to retrieve a record of the FITB question from database 150. The lookup operation can specify a set identifier and term identifier to use as lookup keys to find the correct record. In response, database 150 returns a record with the attribute values that were stored at block 170 in a response to the e-learning web application, mediated by the microservice at block 177. These operations can comprise executing a call to an endpoint of the web application, calling the support service, and executing a lookup in the Spanner database for the question.

In an embodiment, as shown at block 178, client-side code can implement consistency checking. Such a check is important in case the term set of block 172 was edited in the time between writing the record at block 170 and retrieving the record at block 176. Consistency checking can execute by comparing the precomputed keyphrase and keyphrase character span against that span of the current version of the term text. The checking code can test the equality of: A: The trimmed, lowercased precomputed keyphrase string; and B: The trimmed, lowercased character span of the current term, corresponding to the precomputed keyphrase character span.

Alternatively, a timestamp-based consistency check could be used. For example, if a timestamp value contained in a database query of block 176 does not match the timestamp value that had been stored in the record at block 170, the system can be programmed to return an exception, error, null value, or notification that a FITB question is not available. If the timestamps are consistent, then the FITB question is returned via block 174, block 172. In the response path, block 174 can be programmed to generate and transmit presentation instructions to the computing device 103 to cause displaying the FITB question.

In some embodiments, the inference stage can be triggered via a different mechanism. When a user navigates to a study mode via block 172 and a request is made to look up the FITB via block 174 and block 176, if no record exists in the database 150 to indicate that the inference has been made already (which may be an empty record indicating that inference has been attempted and nothing was generated), an empty response is returned immediately, but an inference is triggered in the background, for example, by initiating a new execution thread at block 166. With this approach, when a user studies the same term or term set at another time, the FITB will have been generated. This flow also can be used when a user attempts to study a set that was created before the process of this disclosure is deployed in a larger, pre-existing system since the pub-sub-based flow described above only works for sets that were created after the flow became available for use.

In various embodiments, the functional elements of FIG. 1B can execute using a server computer, one or more cloud services, or a combination. In one embodiment, the microservice referenced in FIG. 1B is an instance of code executing via Google Kubernetes Engine (GKE), and the FITB inference stage executes using code running on a Google Vertex Endpoint. Both GKE and Vertex can execute as cloud services.

2.2 Example Data Processing Flows

FIG. 2A, FIG. 2B illustrates an example computer-implemented process that can be programmed to implement an embodiment of training and executing the FITB generator service of FIG. 1A. FIG. 2A, FIG. 2B and each other flow diagram herein are intended as illustrations at the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

2.2.1 Preparation of Training Data

Referring first to FIG. 2A, a process of training a machine learning model for use in FITB question generation is shown in more detail. At block 202, in an embodiment, a computer-implemented process is programmed to access a training dataset of digitally stored, user-generated FITB terms. The training dataset thus comprises a large number of digital records of educational terms that contain a blank token, such as a range of underscore characters like "_____", in the word or definition.

At block 204, the process is configured to prepare the training data for use in training the machine learning model 135. In various embodiments, block 204 can comprise steps or operations that are manual or human-mediated, fully automatic operations, or a combination. Embodiments of block 204 can be configured to address multiple classes of errors in training data that the inventors discovered, in an inventive moment, and/or through experiments. For example, certain kinds of punctuation in training data can cause a class of errors, such as terms like "1945: The end of WWII". Certain open-source tokenization libraries will generate model training that causes a model to blank out "1945" as well as the next word because the libraries do not process the punctuation properly for the present problem domain. The presence of semicolons could indicate a list and synonyms, which do not produce useful models if left in the training data. A multipart answer with two blanks and two answers separated by a semicolon also would provide errors in models expecting one blank; therefore, such answers should be removed from the training data.

In some embodiments, the training data comprises a sample of user-created terms that contain sequences of one or more underscore characters like "_____", which is interpreted as blank; embodiments interpret the other side of the term as the correct answer to the fill-in-the-blank question. An example term could be:

| Question | Answer |
| --- | --- |
| Spanish is the ___ most spoken language in the U.S. | second |

After certain filtering, resampling, and transformation, training data having the preceding form can be used to train the model to predict blanks for terms that do not contain blanks or sequences of underscore characters.

FILTERS. Referring now to FIG. 2B, in one embodiment, block 204 first comprises operation 220 to apply one or more filters to terms in the training dataset. In an embodiment, terms meeting any of the following conditions are filtered out of the training dataset:

1. The answer contains ";" because this often indicates multi-part answers or explanations;
2. The answer contains "?" because this often indicates ill-formed questions that are not FITBs;
3. The answer contains "_" because this often indicates content that is not a FITB;
4. The answer contains the newline character "\n";
5. The answer starts with a numbered or lettered tag such as "2." or "B)" since this often indicates MCQs or solution-like content;
6. The answer appears in the question because these tend to be bad questions whose answers are too obvious;
7. The answer is "a", "b", "c", "d", or "e" because these tend to be solutions to multiple-choice questions.

TRANSFORMATIONS. Selected terms are subjected to transformations of the answer side of the term and the question side of the term, as follows, in one embodiment. As shown in block 222, block 224, the process can be programmed to automatically apply one or more answer-side transformations to the answer side of a term, and one or more question-side transformations to the question side of the term.

ON THE ANSWER SIDE. In an embodiment, the answer side of a term is filtered to:

1. Remove pairs of "*" characters, as these are used to delimit or mark bold text in some embodiments;
2. Remove leading punctuation;
3. Remove trailing periods, other than those that appear to be part of acronyms;
4. Remove other and trailing punctuation;
5. Remove leading answer indicators, such as "the answer is", "answer", or "solution";
6. Normalize and trim whitespace.

ON THE QUESTION SIDE. In an embodiment, the question side of a term is filtered to:

1. Remove pairs of "*" characters, as these are used to delimit or mark bold text in some embodiments;
2. Transform non-standard blanks such as "*_____*" or "(_____)" to "_____".
3. Transform "is/are" to "is" and "a/an" to "a";
4. Remove "(s)" when it appears after the blank.

COMBINING. At block 226, the process can be programmed to combine filtered, transformed dataset terms with answer values and metadata specifying a target span. In an embodiment, after the above transformations, block 204 comprises digitally completing, in a stored record of a term in the training dataset, the blank of a question with the answer value and maintaining column attribute values, pointers, or other digitally stored values that represent the answer's position as the target span for the model to learn. A target span, in this context, comprises a character position at the start of a blank, and the length of the blank. In the process of executing the combination step, the process is programmed to detect and correct spans of the blank that overlap with the part of the question. Examples include:

1. "Stanley _____ was a chemist" and "Stanley Miller" would be combined to "Stanley was a chemist" (where square brackets indicate the target span, and square brackets are shown only for clarity and would not form a part of the output);
2. "Bat and human arm bones are h_____ structures" and "homologous" would be combined to "Bat and human arm bones are [[homologous]] structures".

TOKENIZATION AND TOKEN NORMALIZATION. At block 228, the process is programmed to execute tokenization of the training dataset. When TensorFlow is used as the model execution engine, multiple tokenizers are available; an embodiment can use, for example, tensorflow.keras.preprocessing.text.Tokenizer. In an embodiment, the following transformations are applied to both the combined training term during training and to the target string at inference time.

1. In an embodiment, one or more programmatic calls to the "spacy" tokenizer library cause adding spaces between tokens, which the TensorFlow tokenizer will later interpret as token boundaries. Thus, embodiments reflect the recognition of the inventors, in an inventive moment, that the TensorFlow tokenizer lacks sufficient processing of punctuation for the relevant problem domain whereas the "spacy" library is programmed to treat punctuation such as periods and newline characters as a discrete token, but also will periods in acronyms and process them correctly.

With this approach, punctuation marks including hyphens are generally treated as discrete tokens, except acronyms or common abbreviations containing periods, in which case the period is not interpreted as a separate token. Therefore, the model will learn not to generate blanks in places that span two sentences. Further, punctuation marks indicating the contraction of words and possessive suffixes are treated as separate tokens, which allows entering blanks on one side of a hyphenated term. Finally, newline characters are treated as discrete tokens, to avoid generating output with blanks that span two or more lines.

In implementing tokenization at this stage, embodiments also are configured to cause treating multiple underscores in a row as a single token. Further, numbers containing "," or "." (to indicate thousands, or as a decimal point or marker), starting with "-", or containing a "-" indicating a range are treated as a single token. Otherwise, the TensorFlow tokenizer typically would create a unique token for each different number, negatively impacting training and interrupting whether a blank could be placed in the position of the number. By replacing the number value with a placeholder or marker token, the model can be trained on whether to blank numbers and when.

2. Newline characters are replaced with a special LINEISNEW token.
3. Numbers are replaced with a special NUMVAL token. Because the actual number is not important for the purposes of blank generation, this approach allows the model to generalize its learnings about the position of numbers in the string.
4. Periods are stripped from tokens that are not themselves the period token, such as in acronyms and abbreviations.
5. The designation "vs" is standardized to "v", "an" is standardized to "a", and "are" is standardized to "is".

In an embodiment, text that has been preprocessed according to the foregoing steps, with spaces indicating token boundaries, is passed to the TensorFlow tokenizer. By default, the TensorFlow tokenizer removes punctuation tokens, but in an embodiment, this behavior is disabled by setting the "filters" parameter to an empty string.

RESAMPLING. At block 230, the process is programmed to resample the data to adjust the distributions of the numbers of tokens between the target span and the beginning of the term, and between the target span and the end of the term. Experiments have shown that questions that either start or end with a blank are over-represented in a random sample of user-generated FITB questions. Embodiments are programmed to resample the data such that the distribution of the number of tokens between the target span and the beginning and between the target span and the end both exhibit a smooth, continuous distribution when plotted as a histogram.

2.2.2 Training Stage

At block 232, the process can be programmed to return control to a calling process or prior step; for example, control returns to FIG. 2A, block 206 at which a machine learning model is trained using the prepared training dataset. In one embodiment, the machine learning model of FIG. 3 can be used. Training can be automated, for example, by invoking a Python script, bash script, or invoking or using an AI/ML pipeline orchestration tool.

Thus, using block 202, 204, 206, an embodiment can comprise programmatically creating an untrained machine learning model; accessing a training dataset of digitally stored, user-generated FITB terms; executing one or more operations of preparation of the training dataset; and training the untrained machine learning model to result in creating and storing the trained machine learning model.

2.2.3 Inference Stage

At block 208, the process is programmed to receive, programmatically or via user input to a computer or system that is executing the process, input specifying a candidate term for transformation to a FITB term. Thus, block 208 comprises receiving input specifying a particular term that does not include an FITB portion; typically the term comprises a question side that is complete with no blanks, and an answer side with an answer value, with all of the foregoing comprising digitally stored data values. The process is programmed to produce output terms that always include a single blank, representing from one to N words where typically 1<=N<=10, and multiple non-contiguous blanks are not allowed. For example, the input received at block 204 and the desired output could be:

INPUT: The quick brown fox jumps over the lazy dog

DESIRED OUTPUT: The _____ fox jumps over the lazy dog

In an embodiment, block 208 can include executing a set of rules to determine whether a particular term is eligible for processing to generate a FITB question or element of the term. Example requirements for determining term eligibility, at or just before executing the inference stage, are further described in section 2.2.4 below.

At block 210, the process is programmed to execute an inference stage of the trained model 135 over the input received at block 208, to produce output predictions of the token position and number of tokens of a target span. The target span represents a target location of a FITB portion or a blank location for a question side of the relevant term. In one embodiment, predictions are output in a 2-dimensional array 212.

At block 214, the process is programmed to execute a post-processing step. Array 212 will represent the probability of each pair of (start token, number of tokens), and thus the position and length of a potential span to blank, plus a rank or probability value. In an embodiment, block 214 can be programmed to select the position of the maximum value as the span to blank. However, to eliminate blanks that may have obvious answers, in an embodiment, a penalty value is applied for blanks containing text that is too similar either to (1) text appearing outside the blank or (2) the other side of the term which is shown to users as additional context. Thus, if words in the blank span match or overlap with words appearing outside the blank span, the resulting question with that blank will give away the answer. This can also occur if the blanked-out text appears elsewhere in the definition or word side of a term.

For example, block 214 can comprise, for up to a specified number of iterations, 1. Find the maximum position in the array 212;
2. At block 216, calculate a penalty score as described below;
3. If the penalty score is greater than 0, multiply that position in the array 212 by the penalty and continue the iteration;
4. If the penalty score is 0, use that position as the token span to blank, and end the iterations.

Block 218 of FIG. 2A can represent concluding the process and selecting a final token span position and length. In one embodiment of a penalty score function, "context tokens" are defined as the tokens outside the blank or on the other side of the term. A token-level penalty is calculated for each token in the candidate token span as follows.

1. The penalty is 1.0 if the candidate token exactly matches any of the context tokens;
2. The penalty is 0.5 if the candidate token is a substring of any of the context tokens;
3. The penalty is 0.25 if any of the context tokens is a substring of the candidate token;
4. The penalty is 0.0 otherwise.
5. The final penalty for the candidate token span calculated at block 216 is the average of the penalties for each token.

At block 219, having chosen the token start position and token length of the blank, the process is programmed to call the "spacy" library to recover the original character span corresponding to those tokens. The original character span determines a final character span position and length to blank in a modified term that includes a FITB portion at the final position that was selected.

2.2.4 Determining the Eligibility of a Term at Inference Time

As noted above for block 166 and block 208, the processes described above can be programmed to determine whether or not to generate a FITB for a given term. One embodiment is programmed to evaluate a candidate term against a plurality of rules, which can be defined in regular expressions. For example, rules can implement the following eligibility requirements:

After lowercasing and trimming leading and trailing whitespace from the term and definition:

Both the term and definition must be tagged as English

We have a classifier that detects and sets the language, but it's overridable by the user The term is not a multiple choice or true/false question, per our custom-written content parsing package The side to be blanked (the term or definition) must be longer than the other side by character count The side to be blanked must:

Be non-empty

Have at least 5 tokens (note this is a naive whitespace split, not using the more sophisticated tokenizer used in the main blank identification mode)

Have at most 1 newline character

Not look like a question, as indicated by any of:

Containing a question mark

Ending with "=", ":", "is called", or "because"

Starting with any of the following question words: what, where, which, why, when, who, how, explain, list, provide, describe, give, choose, select, given, compare, contrast, evaluate, discuss, name, define, differentiate, correlate, state, recognize Not look like a math problem as defined by starting with, or having any line starting with any of the following math question words: "calculate", "compute", "round", "convert"

Not contain a blank ("_____")

Not look like a list, as indicated by any of:

Containing "1", "2", "3" in order

Having at least two lines starting with any bullet-like character: ".", "-", "-", "*"

Have at least two occurrences, either at the beginning of a line or as a separate token of any:

"a." through "f."

"a)" through "f)"

"a:" through "f:"

"1." through "6."

"1)" through "6)"

"1:" through "6:"

"i." through "vi."

"i)" through "vi)"

"i:" through "vi:"

Have at least two occurrences, at the beginning of a line of any:

"a" through "f"

"1" through "6"

"i" through "vi"

The other side not to be blanked must:

Not be empty

Not contain a blank ("_____")

Not look like a list (as described above).

The term and definition must not look like a math problem as indicated by meeting all of the following conditions:

One side (term or definition) contains:

At least 3 math-like symbols, including a number, "x", "y", "z", "pi", "e," etc.

At least 2 math-like operators, including: +, -, *, /, ^, =, x, sin, cos, tan, arcsin, arccos, arctan, csc, sqrt, abs, arcsec The other side (term or definition) contains:

At least 1 math-like symbol, as described above

2.3 Example Model, Configuration Parameters, and Code

FIG. 3 illustrates a portion of an example LSTM neural network architecture that can be used in an embodiment. In a preferred embodiment, a trained machine learning model 135 comprises a bidirectional LSTM having 300 memory units, an embedding dimension of 100, an input length of 50, a dense unit size of 10, and a spatial dropout rate of 0.4. Workable models can be configured using programmatic invocations of the TensorFlow library, called using the library Keras, as seen in the code examples below. Keras is a high-level API for neural networks and works on top of TensorFlow. The examples herein presume that the Keras library is installed and functional and has connections to TensorFlow available. A script can be prepared to import dependencies from Keras such as Sequential, Dense, Dropout, and LSTM. Script code to load a text file, create character mappings, prepare the dataset, reshape or scale values, and other administrative operations are omitted as they are within the knowledge of the skilled reader to whom this disclosure is directed.

FIG. 3 illustrates a portion of four (4) memory cells 302, 304, 306, 308 that are linearly coupled and configured to transfer cell state values c1, c2, c3 and hidden state values h1, h2, h3 successively. Each memory cell is configured to receive inputs X1, X2, X3, Xt at successive discrete time steps. The given inputs are multiplied by weight matrices in the memory cells and a bias value is added. A sigmoid function is applied to output vectors Y1, Y2, Y3, Yt respectively, which have values ranging from 0 to 1, corresponding to each number in the cell state. The sigmoid function is programmed to determine which values to keep and which to discard. If a '0' is output for a particular value in the cell state, then a forget gate of the memory cell causes the cell state to forget that piece of information. Similarly, a '1' means that the forget gate causes the cell state to remember that entire piece of information. The vector output from the sigmoid function is multiplied to the cell state.

2.3.1 First Example

A first example embodiment can be programmed to interoperate with library calls provided by TensorFlow version 2.3.4 and Keras 2.4.0. TABLE 1 illustrates an example of code to create a model:

TABLE 1

| First example of model code |
|---|

```
Sequential([
    Embedding(num_words, embedding_dim, input_length),
    Dropout(dropout),
    Bidirectional(LSTM(lstm_units, return_sequences=True,
kernel_regularizer=regularizers.12(12))),
    Dropout(dropout),
    Dense(max_blank_length, activation='sigmoid'),
])
```

Such a model can be configured using the following first example parameters:

1. Tokenizer: Num words: 136329; Uses out of vocabulary token

2. Model:

2.1 Embedding: Input dimension: 136329; Embedding dimension: 200; Input length: 50 (maximum number of tokens in input).

2.2 Dropout: Rate: 0.2

2.3 LSTM, Bidirectional, Units: 300, L2 regularization: 0, which can be omitted; Dropout Rate: 0.2; Dense: Units: 5 (maximum number of tokens in blank); Activation: sigmoid 2.4 Training: Number of samples: 3229743; Optimizer: Adam, Learning rate: 0.005

2.5 Batch size: 4096

2.6 Stopping criteria: Max epochs: 500; Early stopping if accuracy on a validation set of size 248221 declines across a moving average of the last three epochs

2.3.2 Second Example

A second example embodiment can be programmed to interoperate with library calls provided by TensorFlow version 2.3.4, Keras 2.4.0, and Spacy 4.3.0. TABLE 2 illustrates example model code:

TABLE 2

Second example of model code

```
Sequential([
    Embedding(num_words, embedding_dim, input_
    length=max_sequence_len),
    SpatialDropout1D(embedding_dropout),
    Bidirectional(LSTM(lstm_units, return_sequences=True)),
    Dropout(lstm_dropout),
    Dense(max_blank_length, activation='sigmoid'),
])
```

Such a model can be configured using the following second example parameters:

1. Tokenizer: Num words: 136329; Uses out of vocabulary token.
2. Model:
2.1 Embedding: Input dimension: 136329; Embedding dimension: 100. The inventors discovered, in an inventive moment, that lowering the embedding dimension to 100 from 200 could reduce its memory footprint and increase training speed, allowing use of less memory in production use and smaller virtual compute instances. Input length: 50 (maximum number of tokens in input)
2.2 One-dimensional Spatial Dropout Rate: 0.4
2.3 LSTM: Bidirectional; Units: 300; Dropout Rate: 0.2; Dense Units: 10 (maximum number of tokens in the blank); Activation: sigmoid
2.4 Training: Number of samples: 11057021; Optimizer: Adam; Learning rate: 0.005; Batch size: 8192; GPUs: 2; Stopping criteria: Max epochs: 500; Early stopping if accuracy on a validation set of size 581949 declines across a moving average of the last five epochs.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IOT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using an application server computer that is communicatively coupled to a database via a telecommunication network, the database comprising a digitally stored relational table schema of a plurality of relational tables storing a plurality of term sets, each of the term sets comprising a plurality of terms, the application server computer hosting an application program programmed with a fill-in-the-blank (FITB) question generator service, the method comprising:

configuring an untrained machine learning model as a bidirectional long short-term memory model via programmatic invocations of one or more machine learning code libraries or APIs that specify parameter values for embedding, dropout, and dense parameters of the machine learning model;

accessing a training dataset of digitally stored, user-generated FITB terms, executing one or more operations of preparation of the training dataset, and training the untrained machine learning model to create and store a trained machine learning model;

using the application server computer, receiving input specifying a particular term that does not include an FITB portion, and in response to the input, using the application server computer, executing an inference stage of the trained machine learning model over the particular term as input to generate output predictions comprising a token position and number of tokens of a target span of an FITB portion, the target span representing a target location of the FITB portion for a question side of the particular term;

using the application server computer, post-processing the output predictions by computing a penalty score, selecting a final position, and determining a final span to blank by calling a program library to recover an original character span corresponding to the number of tokens;

using the application server computer, digitally storing a modified term comprising the FITB portion at the final position.

2. The computer-implemented method of claim 1, wherein the executing one or more operations of preparation of the training dataset comprises:

applying one or more filters to terms of the training dataset;

applying one or more answer-side transformations to terms of the training dataset;

applying one or more question-side transformations to terms of the training dataset;

combining the filtered, transformed terms of the training dataset with answer values and metadata specifying target spans;

executing tokenization of the training dataset;

resampling the training dataset to adjust distributions of numbers of tokens between the target spans and beginnings, and target spans and ends.

3. The computer-implemented method of claim 1, wherein the trained machine learning model comprises a bidirectional long short-term memory model having 300 memory units, an embedding dimension of 100, an input length of 50, and a dense units parameter of 10.

4. The computer-implemented method of claim 1, further comprising, using the application server computer, formatting and transmitting, to a client computer, presentation instructions which when rendered using the client computer cause presenting a user interface comprising the modified term comprising the FITB portion at the final position in response to a request from the client computer to view the particular term.

5. The computer-implemented method of claim 1, each of the term sets corresponding to an educational subject in an e-learning system, each of the terms in the plurality of terms comprising a digitally stored question associated with the educational subject.

6. The computer-implemented method of claim 1, the output predictions being generated in a two-dimensional array of values comprising a probability of a pair of a start token and a number of tokens corresponding to a position and length of a potential span to blank; the method further comprising:

for a finite number of iterations:

finding a maximum position in the array, the maximum position specifying a candidate token;

calculating a penalty score using a per-token score of: "1" when a candidate token exactly matches any context token among one or more context tokens, the context tokens comprising tokens outside the blank or on the other side of the term; "0.5" when the candidate token is a substring of any of the context tokens; "0.25" when any of the context tokens is a substring of the candidate token; and "0" otherwise; and calculating the penalty score as an average of all the per-token scores;

when the penalty score is greater than "0", multiplying the maximum position in the array and continuing a then-current iteration;

when the penalty score is "0", using the maximum position as a token span to blank and ending the iterations.

7. One or more non-transitory computer-readable storage media storing one or more sequences of instructions which, when executed using one or more processors, cause the one or more processors to execute:

using an application server computer that is communicatively coupled to a database via a telecommunication network, the database comprising a digitally stored relational table schema storing a plurality of term sets, each of the term sets comprising a plurality of terms, the application server computer hosting an application program programmed with a fill-in-the-blank (FITB) question generator service, receiving input specifying a particular term that does not include an FITB portion, and in response to the input, using the application server computer, executing an inference stage of a trained machine learning model over the particular term as input to generate output predictions comprising a token position and number of tokens of a target span of an FITB portion;

using the application server computer, post-processing the output predictions by computing a penalty score, selecting a final position, and determining a final span to blank;

using the application server computer, digitally storing a modified term comprising the FITB portion at the final position;

using an application server computer that is communicatively coupled to a database via a telecommunication network, the database comprising a digitally stored relational table schema of a plurality of relational tables storing a plurality of term sets, each of the term sets comprising a plurality of terms, the application server computer hosting an application program programmed with a fill-in-the-blank (FITB) question generator service, configuring an untrained machine learning model as a bidirectional long short-term memory model via programmatic invocations of one or more machine learning code libraries or APIs that specify parameter values for embedding, dropout, and dense parameters of the machine learning model:

using the application server computer, accessing a training dataset of digitally stored, user-generated FITB terms, executing one or more operations of preparation of the training dataset, and training the untrained machine learning model to create and store a trained machine learning model;

using the application server computer, receiving input specifying a particular term that does not include an FITB portion, and in response to the input, using the application server computer, executing an inference stage of the trained machine learning model over the particular term as input to generate output predictions comprising a token position and number of tokens of a target span of an FITB portion, the target span representing a target location of the FITB portion for a question side of the particular term;

using the application server computer, post-processing the output predictions by computing a penalty score, selecting a final position, and determining a final span to blank by calling a program library to recover an original character span corresponding to the number of tokens;

using the application server computer, digitally storing a modified term comprising the FITB portion at the final position.

8. The one or more non-transitory computer-readable storage media of claim 7, wherein the executing one or more operations of preparation of the training dataset comprises one or more sequences of instructions which, when executed using one or more processors, cause the one or more processors to execute:

applying one or more filters to terms of the training dataset;

applying one or more answer-side transformations to terms of the training dataset;

applying one or more question-side transformations to terms of the training dataset;

combining the filtered, transformed terms of the training dataset with answer values and metadata specifying target spans;

executing tokenization of the training dataset;

resampling the training dataset to adjust distributions of numbers of tokens between the target spans and beginnings, and target spans and ends.

9. The one or more non-transitory computer-readable storage media of claim 7, wherein the trained machine learning model comprises a bidirectional long short-term memory model having 300 memory units, an embedding dimension of 100, an input length of 50, and a dense units parameter of 10.

10. The one or more non-transitory computer-readable storage media of claim 7, further comprising one or more sequences of instructions which, when executed using one or more processors, cause the one or more processors to execute, using the application server computer, formatting and transmitting, to a client computer, presentation instructions which when rendered using the client computer cause presenting a user interface comprising the modified term comprising the FITB portion at the final position in response to a request from the client computer to view the particular term.

11. The one or more non-transitory computer-readable storage media of claim 7, each of the term sets corresponding to an educational subject in an e-learning system, each of the terms in the plurality of terms comprising a digitally stored question associated with the educational subject.

12. The one or more non-transitory computer-readable storage media of claim 7, the output predictions being generated in a two-dimensional array of values comprising a probability of a pair of a start token and a number of tokens corresponding to a position and length of a potential span to blank; the one or more sequences of instructions, when executed using one or more processors, further cause the one or more processors to execute:

for a finite number of iterations:

finding a maximum position in the array, the maximum position specifying a candidate token;

calculating a penalty score using a per-token score of: "1" when a candidate token exactly matches any context token among one or more context tokens, the context tokens comprising tokens outside the blank or on the other side of the term; "0.5" when the candidate token is a substring of any of the context tokens; "0.25" when any of the context tokens is a substring of the candidate token; and "0" otherwise; and calculating the penalty score as an average of all the per-token scores;

when the penalty score is greater than "0", multiplying the maximum position in the array and continuing a then-current iteration;

when the penalty score is "0", using the maximum position as a token span to blank and ending the iterations.

* * * * *